(12) United States Patent
Zhang et al.

(10) Patent No.: US 12,200,413 B2
(45) Date of Patent: Jan. 14, 2025

(54) METHOD AND DEVICE FOR RESPONDING TO REGISTRATION REQUEST

(71) Applicant: ZTE Corporation, Shenzhen (CN)

(72) Inventors: Weiliang Zhang, Shenzhen (CN);
Liquan Yuan, Shenzhen (CN);
Junshan Wei, Shenzhen (CN);
Xingang Huang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 150 days.

(21) Appl. No.: 18/021,195

(22) PCT Filed: Jul. 26, 2021

(86) PCT No.: PCT/CN2021/108471
§ 371 (c)(1),
(2) Date: Feb. 14, 2023

(87) PCT Pub. No.: WO2022/033295
PCT Pub. Date: Feb. 17, 2022

(65) Prior Publication Data
US 2023/0353915 A1 Nov. 2, 2023

(30) Foreign Application Priority Data
Aug. 14, 2020 (CN) .......................... 202010820520.2

(51) Int. Cl.
*H04Q 11/00* (2006.01)
(52) U.S. Cl.
CPC . *H04Q 11/0067* (2013.01); *H04Q 2011/0086* (2013.01)

(58) Field of Classification Search
CPC .................................................. H04Q 11/0067
See application file for complete search history.

(56) References Cited

U.S. PATENT DOCUMENTS

2016/0352451 A1* 12/2016 Luo ...................... H04J 14/0235
2020/0344534 A1* 10/2020 Luo ...................... H04Q 11/0067

FOREIGN PATENT DOCUMENTS

| CN | 102387426 A | 3/2012 |
| CN | 109150366 A | 1/2019 |

(Continued)

OTHER PUBLICATIONS

International Search Report for corresponding application filed Jul. 26, 2021; Mail date Oct. 14, 2021.
(Continued)

*Primary Examiner* — Shi K Li
(74) *Attorney, Agent, or Firm* — CANTOR COLBURN LLP (57) ABSTRACT

Provided are a method and device for responding to a registration request. The method includes: an Alloc-ID configuration table sent by an Optical Line Terminal (OLT) is received, the Alloc-ID configuration table including corresponding relationships between Alloc-IDs and upstream rates; the Alloc-ID configuration table is parsed to determine a target Alloc-ID from the corresponding relationships between the Alloc-IDs and the upstream rates, the rates corresponding to the target Alloc-ID including the rate supported by an Optical Network Unit (ONU); and a registration request sent by the OLT is responded to based on the target Alloc-ID, the registration request carrying the target Alloc-ID.

20 Claims, 4 Drawing Sheets

(56) References Cited

FOREIGN PATENT DOCUMENTS

| | | |
|---|---|---|
| CN | 109286864 A | 1/2019 |
| CN | 112492411 A | 3/2021 |
| EP | 2117167 A1 | 11/2009 |
| WO | 2020062938 A1 | 4/2020 |

OTHER PUBLICATIONS

European Search Report for corresponding application EP21855348; Report dated Jan. 9, 2024.

* cited by examiner

METHOD AND DEVICE FOR RESPONDING TO REGISTRATION REQUEST

CROSS-REFERENCE TO RELATED APPLICATION

The present disclosure claims priority to Chinese Patent Application No. CN202010820520.2, filed on Aug. 14, 2020, and entitled "Method and Device for Responding to Registration Request", the disclosure of which is hereby incorporated by reference in its entirety.

TECHNICAL FIELD

Embodiments of the present disclosure relate to the field of communications, in particular to a method and device for responding to a registration request.

BACKGROUND

In ITU-T G.989.3, three Alloc-IDs, namely 1021, 1022 and 1023, are defined and reserved for registration activation of Optical Network Units (ONU) with different upstream rates. At present, G.hsp.ComTC for a 50G Passive Optical Network (PON) is being defined, and the upstream rates include 10 Gbps, 12.5 Gbps, 25 Gbps, and 50 Gbps. According to the way of assigning fixed Alloc-IDs, it is needed to reserve one Alloc-ID for each rate and one Alloc-ID for a combination of these rates, so more Alloc-IDs need to be reserved.

Therefore, there are problems in the conventional art that many registration Transmission containers (T-CONT) need to be statically reserved, and the use efficiency of the T-CONT is low:

For the above technical problems, no effective solution has been proposed in the related art.

SUMMARY

The embodiments of the present disclosure provide a method and device for responding to a registration request to at least solve the problem of low use efficiency of T-CONT in the related art.

According to an embodiment of the present disclosure, a method for responding to a registration request is provided, which may include the following operations. An Alloc-ID configuration table sent by an Optical Line Terminal (OLT) is received, the Alloc-ID configuration table including corresponding relationships between Alloc-IDs and upstream rates. The Alloc-ID configuration table is parsed to determine a target Alloc-ID from the corresponding relationships between the Alloc-IDs and the upstream rates, the rates corresponding to the target Alloc-ID including the rate supported by an ONU. A registration request sent by the OLT is responded to based on the target Alloc-ID, the registration request carrying the Alloc-ID matching the target Alloc-ID.

According to another embodiment of the present disclosure, a method for receiving a response message is provided, which may include the following operations. An Alloc-ID configuration table is obtained, the Alloc-ID configuration table including corresponding relationships between Alloc-IDs and upstream rates. The Alloc-ID configuration table is sent to an ONU, so that the ONU determines a target Alloc-ID from the Alloc-ID configuration table, the rates corresponding to the target Alloc-ID including the rate supported by the ONU. A registration request is sent to the ONU. A response is received from the ONU, the response being sent by the ONU when the Alloc-ID carried in the registration request matches the target Alloc-ID.

According to another embodiment of the present disclosure, a device for responding to a registration request is provided, which may include: a first receiving module, a first parsing module, and a first responding module. The first receiving module is configured to receive an Alloc-ID configuration table sent by an OLT, the Alloc-ID configuration table including corresponding relationships between Alloc-IDs and upstream rates. The first parsing module is configured to parse the Alloc-ID configuration table to determine a target Alloc-ID from the corresponding relationships between the Alloc-IDs and the upstream rates, the rates corresponding to the target Alloc-ID including the rate supported by an ONU. The first responding module is configured to respond to a registration request sent by the OLT based on the target Alloc-ID, the registration request carrying the Alloc-ID matching the target Alloc-ID.

According to another embodiment of the present disclosure, a device for receiving a response message is provided, which may include: a first obtaining module, a first sending module, a second sending module, and a second receiving module. The first obtaining module is configured to obtain an Alloc-ID configuration table, the Alloc-ID configuration table including corresponding relationships between Alloc-IDs and upstream rates. The first sending module is configured to send the Alloc-ID configuration table to an ONU, so that the ONU determines a target Alloc-ID from the Alloc-ID configuration table, the rates corresponding to the target Alloc-ID including the rate supported by the ONU. The second sending module is configured to send a registration request to the ONU. The second receiving module is configured to receive a response from the ONU, the response being sent by the ONU when the Alloc-ID carried in the registration request matches the target Alloc-ID.

According to yet another embodiment of the present disclosure, a computer-readable storage medium is also provided, in which a computer program is stored. The computer program is configured to execute, when running, the steps in any above method embodiment.

According to yet another embodiment of the present disclosure, an electronic device is also provided, which includes a memory and a processor. The memory stores a computer program. The processor is configured to run the computer program, so as to perform steps in any of the above method embodiments.

DETAILED DESCRIPTION OF THE EMBODIMENTS

The present disclosure is elaborated below with reference to the accompanying drawings and embodiments.

It should be noted that the specification and claims of the application and terms "first", "second", etc. in the foregoing drawings are used for distinguishing similar objects rather than describing a specific sequence or a precedence order.

Figure 1:
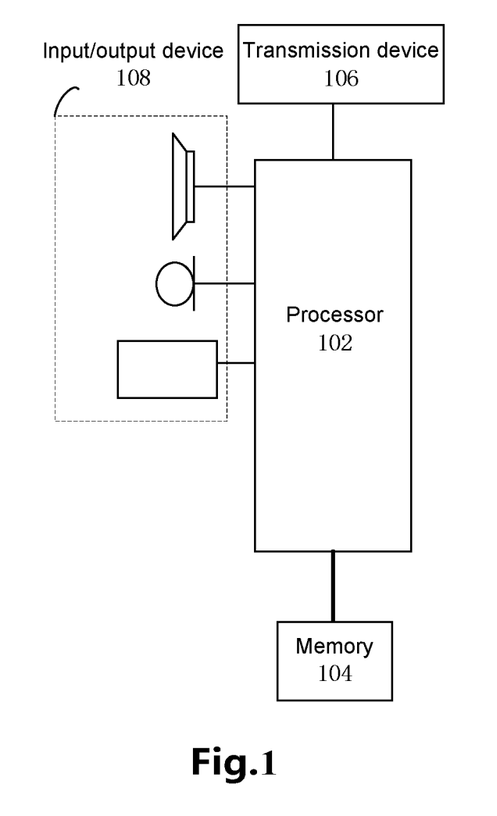
FIG. 1 is a structural block diagram of hardware of a mobile terminal in a method for responding to a registration request according to an embodiment of the present disclosure.

The method embodiment provided by the embodiments of the application may be performed in a mobile terminal, a computer terminal or similar operating devices. By taking that the method is performed on the mobile terminal, FIG. 1 is a structural block diagram of hardware of a mobile terminal in a method for responding to a registration request according to an embodiment of the present disclosure. As shown in FIG. 1, the mobile terminal may include one or more (only one is shown in FIG. 1) processors 102 (the processors 102 may include, but are not limited to, a Micro Processor Unit (MCU) or a Field Programmable Gate Array (FPGA), and other processing devices), a memory 104 configured to store data. The mobile terminal may also include a transmission device 106 with a communication function and an input and output device 108. Those of ordinary skill in the art should know that the structure shown in FIG. 1 is only schematic and not intended to limit the structure of the mobile terminal. For example, the mobile terminal may also include more or less components than that in FIG. 1, or has a configuration different from that in FIG. 1.

The memory 104 may be configured to store a computer program, for example, a software program and a module of application software, for example, a computer program corresponding to the method for responding to a registration request in the embodiments of the present disclosure. The processor 102 runs the computer program stored in the memory 104, thereby executing various functional applications and data processing, namely implementing the above method. The memory 104 may include a high-speed random access memory and may also include a nonvolatile memory, for example, one or more magnetic storage devices, flash memories or other nonvolatile solid-state memories. In some examples, the memories 104 may further include memories remotely set relative to the processor 102, and these remote memories may be connected to the mobile terminal through the network. Examples of the networks include, but are not limited to, the Internet, the Intranet, a local area network, a mobile communication network and a combination thereof.

The transmission device 106 is configured to receive or send data through a network. A specific example of the network may include a wireless network provided by a communication provider of the mobile terminal. In an example, the transmission device 106 includes a Network Interface Controller (NIC), which may be connected with other network devices through a base station, thereby communicating with the Internet. In an example, the transmission device 106 may be a Radio Frequency (RF) module, which is configured to communicate with the Internet in a wireless manner.

Figure 2:
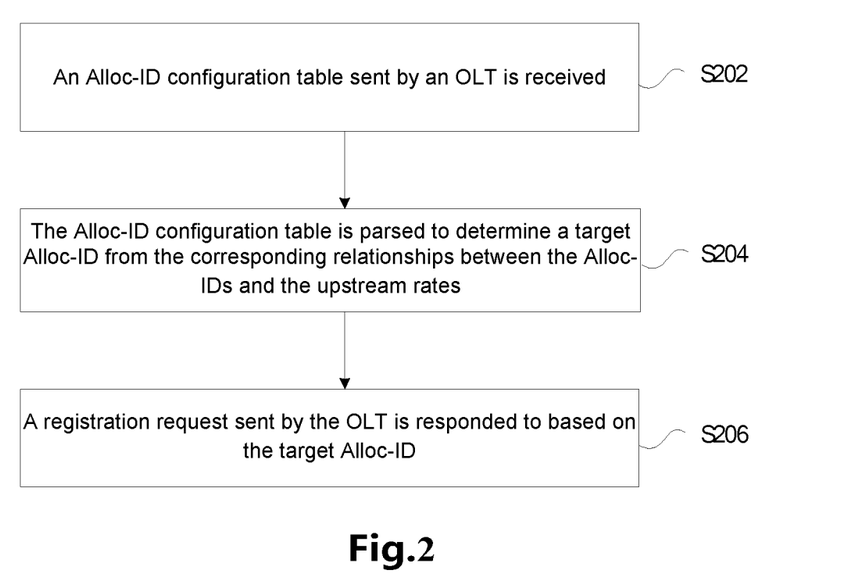
FIG. 2 is a flowchart of a method for responding to a registration request according to an embodiment of the present disclosure.

A method for responding to a registration request is provided in an embodiment. FIG. 2 is a flowchart of the method for responding to a registration request according to an embodiment of the present disclosure. As shown in FIG. 2, the flow may include the following steps.

At S202, an Alloc-ID configuration table sent by an OLT is received. The Alloc-ID configuration table includes corresponding relationships between Alloc-IDs and upstream rates.

In an exemplary embodiment, the Alloc-ID configuration table may be configured by a network management system. The network management system configures the Alloc-IDs and the upstream rates in one-to-one correspondence in the Alloc-ID configuration table based on networking requirements. As shown in Table 1, the designation in Table 1 includes, but is not limited to, the upstream rates corresponding to the Alloc-IDs. The OLT may embed Table 1 in other message bodies to send to the ONU.

TABLE 1

| N reserved Alloc-IDs | Identifying the reserved Alloc-IDs |
|---|---|
| Alloc-ID1 | Designation 1 |
| ... | |
| Alloc-ID N | Designation N |

In an exemplary embodiment, the Alloc-ID in the Alloc-ID configuration table is no longer reserved fixedly, but may be configured based on the requirements of the ONU. For example, in ITU-T G.989.3, three Alloc-IDs, namely 1021, 1022 and 1023, are defined and reserved respectively for registration activation of the ONU at different upstream rates, as shown in Table 2. 1021 is used for registration activation of the ONU at the upstream rate 9.95328 Gbit/s or 2.48832 Gbit/s, 1022 is used for registration activation of the ONU at the upstream rate 9.95328 Gbit/s, and 1023 is used for registration activation of the ONU at the upstream rate 2.48832 Gbit/s.

TABLE 2

| Alloc-ID | Designation | Comment |
|---|---|---|
| 0 ... 1020 | Default | Default Alloc-ID, which is implicitly assigned with, and is equal to, the ONU-ID. |
| 1021 | Broadcast | Used by the OLT Channel Termination (CT) in a Serial Number (SN) grant allocation structure (i.e. an activation request/an registration request) to indicate that any ONU transmitting at either 9.95328 Gbit/s or 2.48832 Gbit/s upstream line rate which executes an SN acquisition phase of the activation procedure may use this allocation to transmit an SN response. |
| 1022 | Broadcast | Used by the OLT CT in an SN grant allocation structure (i.e. an activation request/an registration request) to indicate that any ONU transmitting at 9.95328 Gbit/s upstream line rate which executes the SN acquisition phase of the activation procedure may use this allocation |

TABLE 2-continued

| Alloc-ID | Designation | Comment |
| --- | --- | --- |
| | | to transmit an SN response. |
| 1023 | Broadcast | Used by the OLT CT in an SN grant allocation structure (i.e. an activation request/an registration request) to indicate that any ONU transmitting at 2.48832 Gbit/s upstream line rate which executes the SN acquisition phase of the activation procedure may use this allocation to transmit an SN response. |
| 1024 . . . 16383 | Assignable | If more than a single Alloc-ID is needed for an ONU, the OLT CT assigns additional Alloc-IDs to that ONU by selecting a unique number from this range and communicating it to the ONU using the Physical Layer Operation Administration & Maintenance Assign_Alloc-ID (PLOAM). |

According to Table 2, it is needed to reserve one Alloc-ID for each rate, and one Alloc-ID for a combination of these rates, so more Alloc-IDs need to be reserved. And this method is not flexible enough, and if a new PON needs to be standardized in the future, the reservation of the Alloc-ID needs to be further modified. In addition, in a traditional PON, 1021 is generally used as a registration Alloc-ID; in a low-latency PON, the ONU is expected to complete registration on a Dedicated Activation Wavelength (DAW) channel, so an Alloc-ID different from 1021 is needed as the registration Alloc-ID, which is also equivalent to a newly defined reserved Alloc-ID and has a specific purpose.

The Alloc-ID configuration table in the present embodiment enables the reservation of the Alloc-ID to be configured and configures it as an Alloc-ID reservation which may be sent to the ONU through a broadcast message, as shown in Table 3.

In Table 3, 1021, 1022, and 1023 are no longer reserved fixedly, but can be configured to the ONU like other Alloc-IDs or configured as the reserved Alloc-ID.

TABLE 3

| Alloc-ID | Designation | Comment |
| --- | --- | --- |
| 0 . . . 1023 | Default | Default Alloc-ID, which is implicitly assigned with, and is equal to, the ONU-ID. |
| 1024 . . . 16383 | Assignable | If more than a single Alloc-ID is needed for an ONU, the OLT CT assigns additional Alloc-IDs to that ONU by selecting a unique number from this range and communicating it to the ONU using the Assign_Alloc-ID PLOAM message. |

NOTE
1. The OLT CT may use two corresponding Alloc-IDs among 0-1023 1022 or 1023 in use cases with a single upstream rate, 9.95328 Gbit/s or 2.48832 Gbit/s, respectively. The OLT CT may use another Alloc-ID among 0-1023 1021 in dual rate deployments, to reduce the discovery overhead by giving an opportunity to register simultaneously when the OLT CT uses a dual rate receiver. These Alloc-IDs will be broadcast in Activation Alloc-ID PLOAM message before SN request is issued.
NOTE
2. At its discretion, the OLT CT may grant an upstream bandwidth allocation to an assignable Alloc-ID which has not been assigned to any ONU. Such an allocation causes a quiet window in the upstream transmission.

Through the present embodiment, the reservations may be allocated according to needs by configuring the Alloc-ID configuration table, which does not reserve too many Alloc-IDs and is flexible and extensible.

At S204, the Alloc-ID configuration table is parsed to determine a target Alloc-ID from the corresponding relationships between the Alloc-IDs and the upstream rates. The rates corresponding to the target Alloc-ID include the rate supported by the ONU.

At S206, a registration request sent by the OLT is responded to based on the target Alloc-ID. The registration request carries the Alloc-ID matching the target Alloc-ID.

In the present embodiment, there may be one or multiple target Alloc-IDs. In the case of multiple target Alloc-IDs, the Alloc-ID carried in the registration request only needs to match one of the multiple target Alloc-IDs.

Through the above steps, the ONU receives the Alloc-ID configuration table sent by the OLT, the Alloc-ID configuration table including the corresponding relationships between the Alloc-IDs and the upstream rates; the ONU parses the Alloc-ID configuration table to determine the target Alloc-ID from the corresponding relationships between the Alloc-IDs and the upstream rates, the rates corresponding to the target Alloc-ID including the rate supported by the ONU; and the ONU responds to the registration request sent by the OLT based on the target Alloc-ID, the registration request carrying the Alloc-ID matching the target Alloc-ID. In this way, the registration T-CONT may be allocated to the ONU according to needs in different PON systems, avoiding static reservation of many registration T-CONTs. Therefore, the problem of low use efficiency of the T-CONT in the related art can be solved, and the effect of improving the use efficiency of the T-CONT can be achieved.

The execution body of the above steps may be, but is not limited to, the ONU.

In an exemplary embodiment, that the Alloc-ID configuration table is parsed to determine a target Alloc-ID from the corresponding relationships between the Alloc-IDs and the upstream rates may include the following steps.

At S1, the corresponding relationships between the Alloc-IDs and the upstream rates are parsed from the Alloc-ID configuration table.

In the present embodiment, the Alloc-ID configuration table includes multiple entries, and each entry includes the corresponding relationship between the Alloc-ID and the upstream rate.

At S2, in the case that the upstream rates corresponding to the Alloc-ID include the upstream rate of the ONU, the Alloc-ID is determined as the target Alloc-ID.

In the present embodiment, the ONU needs to first parse the Alloc-ID and its designation in the Alloc-ID configuration table, and obtains the target Alloc-ID it supports from the table, that is, the rates corresponding to the target Alloc-ID include the rate supported by the ONU.

In an exemplary embodiment, after the Alloc-ID is determined as the target Alloc-ID in the case that the upstream rates corresponding to the Alloc-ID include the upstream rate of the ONU, the method may also include the following step.

At S1, the target Alloc-ID is saved.

In the present embodiment, the ONU may selectively reserve the Alloc-ID in the Alloc-ID configuration table based on its registration requirements.

In an exemplary embodiment, that the registration request sent by the OLT is responded to based on the target Alloc-ID may include the following steps.

At S1, the registration request sent by the OLT is received.

At S2, in the case that the Alloc-ID in the registration request matches the target Alloc-ID, the SN of the ONU is responded to the OLT.

In the present embodiment, the Alloc-ID in the registration request may be an activation Alloc-ID which may match one of multiple target Alloc-IDs.

The registration requests sent by the OLT include, but are not limited to, an SN request SN-Request. After reserving the Alloc-ID it supports, the ONU waits for the OLT to send the SN-Request. If the Alloc-ID in the SN-Request is supported by the ONU, the ONU responds to its own SN.

In an exemplary embodiment, that the Alloc-ID configuration table sent by the OLT is received may include the following step.

At S1, the Alloc-ID configuration table sent by the OLT is received within a predetermined period.

In the present embodiment, the OLT periodically broadcasts the Alloc-ID configuration table configured by the network management system. The ONU periodically receives the Alloc-ID configuration table, determines the Alloc-ID needing to be reserved from the Alloc-ID configuration table, and updates the previously saved Alloc-ID.

Figure 3:
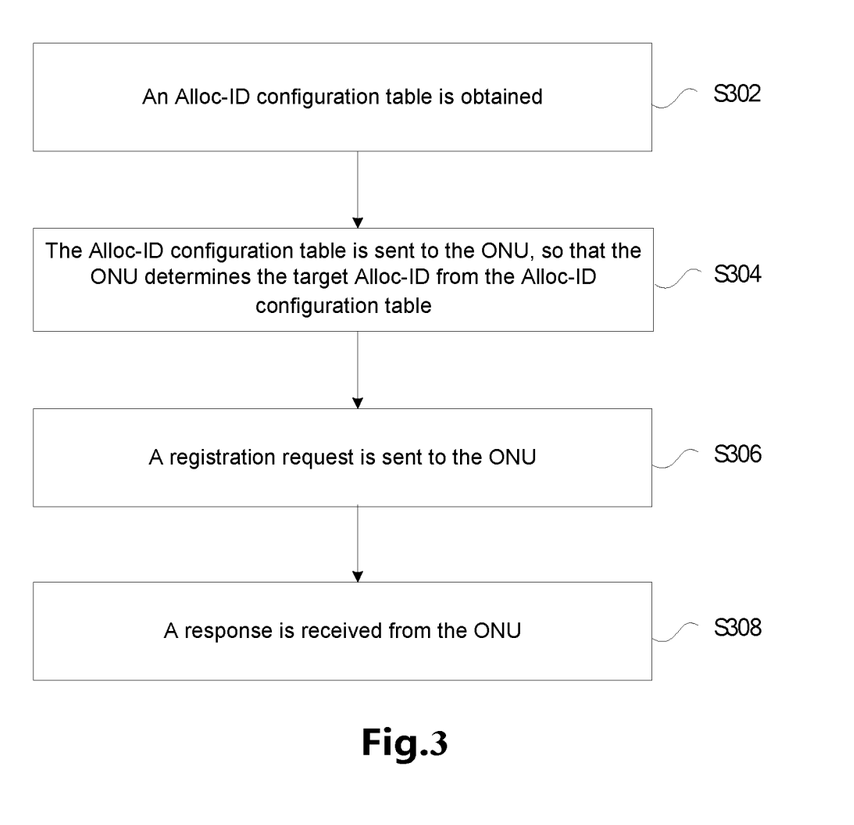
FIG. 3 is a flowchart of a method for receiving a response message according to an embodiment of the present disclosure.

A method for receiving a response message is provided in an embodiment. FIG. 3 is a flowchart of the method for receiving a response message according to an embodiment of the present disclosure. As shown in FIG. 3, the flow may include the following steps.

At S302, an Alloc-ID configuration table is obtained. The Alloc-ID configuration table includes the corresponding relationships between the Alloc-IDs and the upstream rates.

In the present embodiment, the Alloc-ID configuration table may be configured by the network management system. The network management system configures the Alloc-IDs and the upstream rates in one-to-one correspondence in the Alloc-ID configuration table based on networking requirements. As shown in Table 1, the designation in Table 1 includes, but is not limited to, the upstream rates corresponding to the Alloc-IDs. The OLT may embed Table 1 in other message bodies to send to the ONU.

Through the present embodiment, the reservations may be allocated according to needs by configuring the Alloc-ID configuration table, which does not reserve too many Alloc-IDs and is flexible and extensible.

At S304, the Alloc-ID configuration table is sent to the ONU, so that the ONU determines the target Alloc-ID from the Alloc-ID configuration table. The rates corresponding to the target Alloc-ID include the rate supported by the ONU.

At S306, a registration request is sent to the ONU.

At S308, a response is received from the ONU. The response is sent by the ONU when the Alloc-ID carried in the registration request matches the target Alloc-ID.

In the present embodiment, there may be one or multiple target Alloc-IDs. In the case of multiple target Alloc-IDs, the Alloc-ID carried in the registration request only needs to match one of the multiple target Alloc-IDs.

Through the above steps, the OLT obtains the Alloc-ID configuration table, the Alloc-ID configuration table including the corresponding relationships between the Alloc-IDs and the upstream rates; the OLT sends the Alloc-ID configuration table to the ONU, so that the ONU determines the target Alloc-ID from the Alloc-ID configuration table, the rates corresponding to the target Alloc-ID including the rate supported by the ONU; the OLT sends the registration request to the ONU; and the OLT receives the response from the ONU, the response being sent by the ONU when the Alloc-ID carried in the registration request matches the target Alloc-ID. In this way, the registration T-CONT may be allocated to the ONU according to needs in different PON systems, avoiding static reservation of many registration T-CONTs. Therefore, the problem of low use efficiency of the T-CONT in the related art can be solved, and the effect of improving the use efficiency of the T-CONT can be achieved.

The execution body of the above steps may be, but is not limited to, the OLT.

In an exemplary embodiment, that the Alloc-ID configuration table is obtained may include the following step.

At S1, the Alloc-ID configuration table is obtained from the network management system.

In an exemplary embodiment, the Alloc-ID configuration table is sent to the ONU, so that the ONU determines the target Alloc-ID from the Alloc-ID configuration table may include the following step.

At S1, a preset broadcast message is used to send the Alloc-ID configuration table to the ONU within a predetermined period, so that the ONU determines the target Alloc-ID from the Alloc-ID configuration table.

In the present embodiment, the preset broadcast message includes, but is not limited to, the Activation_Alloc-ID message. The broadcast format of the broadcast message is shown in Table 4. In order to support activation on the DAW channel, one Rx may be corresponded to the DAW channel or DAW channel rate. Bit rx=0 indicates that the activation of ONU on the DAW channel is not supported, and bit rx indicates that the activation of ONU on the DAW channel is supported.

TABLE 4

| Octet | Content | Description |
| --- | --- | --- |
| 1-2 | ONU-ID | 0x03FF, Broadcast ONU-ID |
| 3 | Message type ID | 0x1F, "Activation_Alloc-ID" |
| 4 | SeqNo | Eight-bit broadcast PLOAM sequence number |
| 5 | Number of reserved Alloc-IDs for activation | The number of reserved Alloc-IDs for activation |
| 6 | Number of upstream line rates (N ≤ 16) | The number of upstream line rates, R1, R2, . . . , RN |
| 7-8 | Alloc-ID1 | Broadcast Alloc-ID for activation at combination 1 of upstream line rates |
| 9-10 | Combination 1 of upstream line rates | r1r2r3r4r5r6r7r8 r9r10r11r12r13r14r15r16<br>rx = 0, used by the OLT CT in an SN grant allocation structure to indicate that any ONU transmitting at Rx |

TABLE 4-continued

| Octet | Content | Description |
|---|---|---|
| | | upstream line rate which executes the SN acquisition phase of the activation procedure should not use Alloc-ID1 allocation to transmit an SN response.<br>rx -= 1, used by the OLT CT in an SN grant allocation structure to indicate that any ONU transmitting at Rx upstream line rate which executes the SN acquisition phase of the activation procedure may use Alloc-ID1 allocation to transmit an SN response. |
| 11-12 | Alloc-ID2 | Broadcast Alloc-ID for activation at combination 2 of upstream line rates |
| 13-14 | Combination 2 of upstream line rates | r1r2r3r4r5r6r7r8 r9r10r11r12r13r14r15r16<br>rx = 0, used by the OLT CT in an SN grant allocation structure to indicate that any ONU transmitting at Rx upstream line rate which executes the SN acquisition phase of the activation procedure should not use Alloc-ID2 allocation to transmit an SN response.<br>rx -= 1, used by the OLT CT in an SN grant allocation structure to indicate that any ONU transmitting at Rx upstream line rate which executes the SN acquisition phase of the activation procedure may use Alloc-ID2 allocation to transmit an SN response. |
| 15-16 | Alloc-ID3 | Broadcast Alloc-ID for activation at combination 3 of upstream line rates |
| 17-18 | Combination 3 of upstream line rates | r1r2r3r4r5r6r7r8 r9r10r11r12r13r14r15r16<br>rx = 0, used by the OLT CT in an SN grant allocation structure to indicate that any ONU transmitting at Rx upstream line rate which executes the SN acquisition phase of the activation procedure should not use Alloc-ID3 allocation to transmit an SN response.<br>rx -= 1, used by the OLT CT in an SN grant allocation structure to indicate that any ONU transmitting at Rx upstream line rate which executes the SN acquisition phase of the activation procedure may use Alloc-ID3 allocation to transmit an SN response. |
| 19-20 | Alloc-ID4 | Broadcast Alloc-ID for activation at combination 4 of upstream line rates |
| 21-22 | Combination 4 of upstream line rates | r1r2r3r4r5r6r7r8 r9r10r11r12r13r14r15r16<br>rx = 0, used by the OLT CT in an SN grant allocation structure to indicate that any ONU transmitting at Rx upstream line rate which executes the SN acquisition phase of the activation procedure should not use Alloc-ID4 allocation to transmit an SN response.<br>rx -= 1, used by the OLT CT in an SN grant allocation structure to indicate that any ONU transmitting at Rx upstream line rate which executes the SN acquisition phase of the activation procedure may use Alloc-ID4 allocation to transmit an SN response. |
| 23-24 | Alloc-ID5 | Broadcast Alloc-ID for activation at combination 5 of upstream line rates |
| 25-26 | Combination 5 of upstream line rates | r1r2r3r4r5r6r7r8 r9r10r11r12r13r14r15r16<br>rx = 0, used by the OLT CT in an SN grant allocation structure to indicate that any ONU transmitting at Rx upstream line rate which executes the SN acquisition phase of the activation procedure should not use Alloc-ID5 allocation to transmit an SN response.<br>rx-=1, used by the OLT CT in an SN grant allocation structure to indicate that any ONU transmitting at Rx upstream line rate which executes the SN acquisition phase of the activation procedure may use Alloc-ID5 allocation to transmit an SN response. |
| 27-28 | Alloc-ID6 | Broadcast Alloc-ID for activation at combination 6 of upstream line rates |
| 29-30 | Combination 6 of upstream line rates | r1r2r3r4r5r6r7r8 r9r10r11r12r13r14r15r16<br>rx = 0, used by the OLT CT in an SN grant allocation structure to indicate that any ONU transmitting at Rx upstream line rate which executes the SN acquisition phase of the activation procedure should not use Alloc-ID6 allocation to transmit an SN response.<br>rx -=1 , used by the OLT CT in an SN grant allocation structure to indicate that any ONU transmitting at Rx upstream line rate which executes the SN acquisition phase of the activation procedure may use Alloc-ID6 allocation to transmit an SN response. |
| 31-32 | Alloc-ID7 | Broadcast Alloc-ID for activation at combination 7 of upstream line rates |
| 33-34 | Combination 7 of upstream line rates | r1r2r3r4r5r6r7r8 r9r10r11r12r13r14r15r16<br>rx = 0, used by the OLT CT in an SN grant allocation structure to indicate that any ONU transmitting at Rx |

TABLE 4-continued

| Octet Content | Description |
| --- | --- |
| | upstream line rate which executes the SN acquisition phase of the activation procedure should not use Alloc-ID7 allocation to transmit an SN response. rx -= 1, used by the OLT CT in an SN grant allocation structure to indicate that any ONU transmitting at Rx upstream line rate which executes the SN acquisition phase of the activation procedure may use Alloc-ID7 allocation to transmit an SN response. |
| 35-36 Alloc-ID8 | Broadcast Alloc-ID for activation at combination 8 of upstream line rates |
| 37-38 Combination 8 of upstream line rates | r1r2r3r4r5r6r7r8 r9r10r11r12r13r14r15r16 rx = 0, used by the OLT CT in an SN grant allocation structure to indicate that any ONU transmitting at Rx upstream line rate which executes the SN acquisition phase of the activation procedure should not use Alloc-ID8 allocation to transmit an SN response. rx -= 1, used by the OLT CT in an SN grant allocation structure to indicate that any ONU transmitting at Rx upstream line rate which executes the SN acquisition phase of the activation procedure may use Alloc-ID8 allocation to transmit an SN response. |
| 39-40 Reserved | |
| 41-48 MIC | Message integrity check, computed using the default PLOAM integrity key. |

Through the above description of implementation modes, those skilled in the art may clearly know that the method according to the above embodiments may be implemented by means of software plus a necessary common hardware platform, certainly by means of hardware: but in many cases, the former is the better implementation. Based on this understanding, the technical solution of the present disclosure substantially or the part making a contribution to the conventional art can be embodied in the form of software product; the computer software product is stored in a storage medium (for example, an ROM/an RAM, a magnetic disk, and a compact disc) and includes a number of instructions to make a computer device (which can be a personal computer, a server or a network device, etc.) perform all or part of the method in each embodiment of the present disclosure.

An embodiment also provides a device for receiving a response message, which is configured to implement the above embodiments and preferred implementations. The embodiments which have been elaborated will not be repeated here. The term "module" used below can realize a combination of software and/or hardware with an intended function. Although the device described in the following embodiment is realized through software better, the realization through hardware or a combination of software and hardware is possible and conceived.

Figure 4:
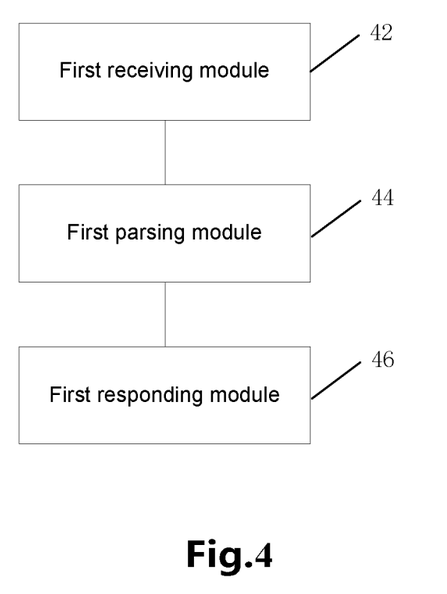
FIG. 4 is a structural block diagram of a device for responding to a registration request according to an embodiment of the present disclosure.

FIG. 4 is a structural block diagram of a device for responding to a registration request according to an embodiment of the present disclosure. As shown in FIG. 4, the device may include: a first receiving module 42, a first parsing module 44, and a first responding module 46. The device is described below.

The first receiving module 42 is configured to receive the Alloc-ID configuration table sent by the OLT. The Alloc-ID configuration table includes the corresponding relationships between the Alloc-IDs and the upstream rates.

The first parsing module 44 is configured to parse the Alloc-ID configuration table to determine the target Alloc-ID from the corresponding relationships between the Alloc-IDs and the upstream rates. The rates corresponding to the target Alloc-ID include the rate supported by the ONU.

The first responding module 46 is configured to respond to the registration request sent by the OLT based on the target Alloc-ID. The registration request carries the Alloc-ID matching the target Alloc-ID.

In an exemplary embodiment, the first parsing module may include: a first parsing unit and a first determining unit.

The first parsing unit is configured to parse the corresponding relationships between the Alloc-IDs and the upstream rates from the Alloc-ID configuration table.

The first determining unit is configured to determine the Alloc-ID as the target Alloc-ID in the case that the upstream rate corresponds to the upstream rate of the ONU.

In an exemplary embodiment, the device may also include: a saving module.

The saving module is configured to save the target Alloc-ID after the Alloc-ID is determined as the target Alloc-ID in the case that the upstream rate corresponds to the upstream rate of the ONU.

In an exemplary embodiment, the first responding module may include: a first receiving unit and a first responding unit.

The first receiving unit is configured to receive the registration request sent by the OLT.

The first responding unit is configured to respond the SN of the ONU to the OLT in the case that the Alloc-ID in the registration request matches the target Alloc-ID.

In an exemplary embodiment, the first receiving module may include: a second receiving unit.

The second receiving unit is configured to receive the Alloc-ID configuration table sent by the OLT within a predetermined period.

Figure 5:
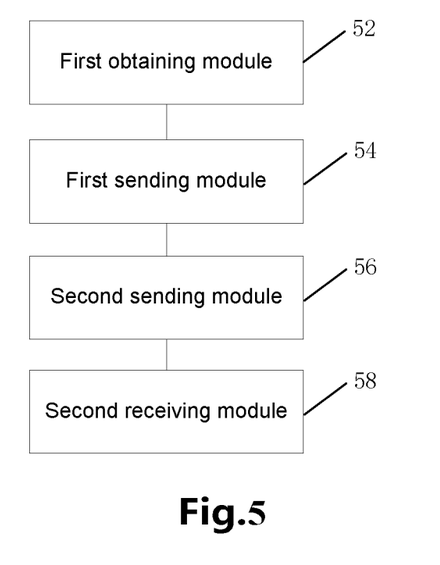
FIG. 5 is a structural block diagram of a device for receiving a response message according to an embodiment of the present disclosure.

FIG. 5 is a structural block diagram of a device for receiving a response message according to an embodiment of the present disclosure. As shown in FIG. 5, the device may include: a first obtaining module 52, a first sending module 54, a second sending module 56, and a second receiving module 58. The device is described below.

The first obtaining module 52 is configured to obtain the Alloc-ID configuration table. The Alloc-ID configuration table includes the corresponding relationships between the Alloc-IDs and the upstream rates.

The first sending module 54 is configured to send the Alloc-ID configuration table to the ONU, so that the ONU determines the target Alloc-ID from the Alloc-ID configuration table. The rates corresponding to the target Alloc-ID include the rate supported by the ONU.

The second sending module 56 is configured to send the registration request to the ONU.

The second receiving module 58 is configured to receive the response from the ONU. The response is sent by the ONU when the Alloc-ID carried in the registration request matches the target Alloc-ID.

In an exemplary embodiment, the first obtaining module may include: a first obtaining unit.

The first obtaining unit is configured to obtain the Alloc-ID configuration table from the network management system.

In an exemplary embodiment, a sending unit is also included.

The sending unit is configured to use a preset broadcast message to send the Alloc-ID configuration table to the ONU within a predetermined period, so that the ONU determines the target Alloc-ID from the Alloc-ID configuration table.

It is to be noted that, each of the above modules may be realized by software or hardware. For the latter, the each of the above modules may be realized by, but not limited to, the following way: all of the above modules are in the same processor: or, the above modules are respectively in different processors in form of any combination.

The embodiments of the present disclosure also provide a computer-readable storage medium, in which a computer program is stored. The computer program is configured to perform, when running, the steps in any of the above method embodiments.

In an exemplary embodiment, the computer-readable storage media may include, but are not limited to, a USB flash disk, a Read-Only Memory (ROM), a Random Access Memory (RAM), a mobile hard disk, a magnetic disk, a compact disc, and other media capable of storing the computer program.

An embodiment of the present disclosure also provides an electronic device, which includes a memory and a processor. The memory stores a computer program. The processor is configured to run the computer program, so as to execute the steps in any of the above method embodiments.

In an exemplary embodiment, the electronic device may also include a transmission device and an input/output device. The transmission device is connected with the processor, and the input/output device is connected with the processor.

The specific examples in the present embodiment may refer to the examples described in the above embodiments and exemplary implementation modes, and will not be repeated here.

It is apparent that those skilled in the art should appreciate that the above modules and steps of the present disclosure may be implemented by a general-purpose computing device, and they may be centralized in a single computing device or distributed on a network composed of multiple computing devices; they may be implemented by a program code which is capable of being executed by the computing device, so that they may be stored in a storage device and executed by the computing device; and in some situations, the presented or described steps may be executed in an order different from that described here; or they are made into integrated circuit modules, respectively; or multiple modules and steps of them are made into a single integrated circuit module to realize. Therefore, the present disclosure is not limited to any particular combination of hardware and software.

The above is only the preferred embodiments of the present disclosure and not intended to limit the present disclosure; for those skilled in the art, the present disclosure may have various modifications and changes. Any modifications, equivalent replacements, improvements and the like within the principle of the present disclosure should fall within the protection scope of the claims of the present disclosure.

What is claimed is:

1. A method for responding to a registration request, comprising:
   receiving an Alloc-ID configuration table sent by an Optical Line Terminal (OLT), wherein the Alloc-ID configuration table comprises corresponding relationships between Alloc-IDs and upstream rates;
   parsing the Alloc-ID configuration table to determine a target Alloc-ID from the corresponding relationships between the Alloc-IDs and the upstream rates, wherein the rate corresponding to the target Alloc-ID comprise the rate supported by an Optical Network Unit (ONU); and
   responding to a registration request sent by the OLT based on the target Alloc-ID, wherein the registration request carries the Alloc-ID matching the target Alloc-ID.

2. The method according to claim 1, wherein parsing the Alloc-ID configuration table to determine a target Alloc-ID from the corresponding relationships between the Alloc-IDs and the upstream rates comprises:
   parsing the corresponding relationships between the Alloc-IDs and the upstream rates from the Alloc-ID configuration table; and
   in a case that the upstream rate corresponding to the Alloc-ID comprise the upstream rate of the ONU, determining the Alloc-ID as the target Alloc-ID.

3. The method according to claim 2, wherein after determining the Alloc-ID as the target Alloc-ID in the case that the upstream rates corresponding to the Alloc-ID comprise the upstream rate of the ONU, the method further comprises:
   saving the target Alloc-ID.

4. An electronic device, comprising a memory and a processor, wherein the memory stores a computer program, and the processor is configured to run the computer program to perform the method according to claim 3.

5. An electronic device, comprising a memory and a processor, wherein the memory stores a computer program, and the processor is configured to run the computer program to perform the method according to claim 2.

6. A non-transitory computer-readable storage medium, in which a computer program is stored, wherein when running, the computer program is configured to perform the method according to claim 2.

7. The method according to claim 1, wherein responding to the registration request sent by the OLT based on the target Alloc-ID comprises:
   receiving the registration request sent by the OLT; and
   in a case that the Alloc-ID in the registration request matches the target Alloc-ID, responding a Serial Number (SN) of the ONU to the OLT.

8. An electronic device, comprising a memory and a processor, wherein the memory stores a computer program, and the processor is configured to run the computer program to perform the method according to claim 7.

9. The method according to claim 1, wherein receiving the Alloc-ID configuration table sent by the OLT comprises:
   receiving the Alloc-ID configuration table sent by the OLT within a predetermined period.

10. An electronic device, comprising a memory and a processor, wherein the memory stores a computer program, and the processor is configured to run the computer program to perform the method according to claim 9.

11. A non-transitory computer-readable storage medium, in which a computer program is stored, wherein when running, the computer program is configured to perform the method according to claim 1.

12. An electronic device, comprising a memory and a processor, wherein the memory stores a computer program, and the processor is configured to run the computer program to perform the method according to claim 1.

13. A method for receiving a response message, comprising:
    obtaining an Alloc-ID configuration table, wherein the Alloc-ID configuration table comprises corresponding relationships between Alloc-IDs and upstream rates;
    sending the Alloc-ID configuration table to an Optical Network Unit (ONU), so that the ONU determines a target Alloc-ID from the Alloc-ID configuration table, wherein the rate corresponding to the target Alloc-ID comprise the rate supported by the ONU;
    sending a registration request to the ONU; and
    receiving a response from the ONU, wherein the response is sent by the ONU when the Alloc-ID carried in the registration request matches the target Alloc-ID.

14. The method according to claim 13, wherein obtaining the Alloc-ID configuration table comprises:
    obtaining the Alloc-ID configuration table from a network management system.

15. An electronic device, comprising a memory and a processor, wherein the memory stores a computer program, and the processor is configured to run the computer program to perform the method according to claim 14.

16. The method according to claim 13, wherein sending the Alloc-ID configuration table to an ONU, so that the ONU determines a target Alloc-ID from the Alloc-ID configuration table comprises:
    using a preset broadcast message to send the Alloc-ID configuration table to the ONU within a predetermined period, so that the ONU determines the target Alloc-ID from the Alloc-ID configuration table.

17. An electronic device, comprising a memory and a processor, wherein the memory stores a computer program, and the processor is configured to run the computer program to perform the method according to claim 16.

18. An electronic device, comprising a memory and a processor, wherein the memory stores a computer program, and the processor is configured to run the computer program to perform the method according to claim 13.

19. A non-transitory computer-readable storage medium, in which a computer program is stored, wherein when running, the computer program is configured to perform the method according to claim 13.

20. A device for responding to a registration request, comprising:
    a first receiving module, configured to receive an Alloc-ID configuration table sent by an Optical Line Terminal (OLT), wherein the Alloc-ID configuration table comprises corresponding relationships between Alloc-IDs and upstream rates;
    a first parsing module, configured to parse the Alloc-ID configuration table to determine a target Alloc-ID from the corresponding relationships between the Alloc-IDs and the upstream rates, wherein the rate corresponding to the target Alloc-ID comprise the rate supported by an Optical Network Unit (ONU); and
    a first responding module, configured to respond to a registration request sent by the OLT based on the target Alloc-ID, wherein the registration request carries the Alloc-ID matching the target Alloc-ID.

* * * * *